United States Patent [19]
Babinec et al.

[11] Patent Number: 5,707,556
[45] Date of Patent: Jan. 13, 1998

[54] TUNGSTEN OXIDE FOR REVERSIBLE ALKALI METAL INTERCALATION REACTIONS

[75] Inventors: Susan J. Babinec; Marianne L. McKelvy, both of Midland, Mich.

[73] Assignee: The Dow Chemical Company, Midland, Mich.

[21] Appl. No.: 575,977

[22] Filed: Dec. 21, 1995

[51] Int. Cl.$^6$ .................. H01B 1/08; G02F 1/15
[52] U.S. Cl. .......... 252/518; 252/519; 252/520; 252/521; 423/641; 428/357; 359/265; 427/77; 427/108; 427/126.3
[58] Field of Search ................ 252/501.1, 518, 252/519, 521; 423/641; 428/357; 359/265; 427/77, 108, 126.3, 126.5

[56] References Cited

U.S. PATENT DOCUMENTS

| | | | |
|---|---|---|---|
| 4,193,970 | 3/1980 | Sefton et al. | 423/141 |
| 4,325,611 | 4/1982 | Huggins et al. | 350/357 |
| 5,080,471 | 1/1992 | Cogan et al. | 359/275 |
| 5,124,080 | 6/1992 | Shabrang et al. | 252/583 |
| 5,147,739 | 9/1992 | Beard | 429/194 |
| 5,168,020 | 12/1992 | Jow | 429/194 |
| 5,260,821 | 11/1993 | Chu et al. | 359/269 |

FOREIGN PATENT DOCUMENTS 60-68558  4/1985  Japan.

OTHER PUBLICATIONS

Talledo et al "Electrochromic vanadium–pentoxide–based films: Structural, electrochemical, and optical properties" J. Appl. Phys., 77(9), May 1, 1995, pp. 4655–4666.

Özer "Reproducibility of the colovation processes in TiO$_2$ films" Thin Solid Films, 214 (1992), pp. 17–24, No Month Available.

Cogan et al "Free–electron electrochromic modulation in crystalline lithium tungstate (Li$_x$ WO$_3$)" J. Appl. Phys., 60(8), 1986, pp. 2735–8. (Abstract Only), No Month Available.

Cogan et al "Electrochromic devices for optical modulation in the infrared" Proc. Electrochem. Soc. 1994, 94+2, pp. 269–77. (Abstract Only), No Month Available.

Maaza et al "Roughness effect on the Lithium diffusity in WO$_3$ thin films" Mater. Res. Soc. Symp. Proc. (1995), 369 (Solid State Ionics IV), pp. 125–30 (Abstract Only). No Month Available.

S. Hashijmoto, et al. "Prolonged Lifetime of Electrochromis of Amorphous WO$_3$–TiO$_2$ Thin Films", *Surface and Interface Analysis*, vol. 19, (1992) pp. 464–468, No Month Available.

M. Lazzari, et al., "A Cyclable Lithium Organic Electrolyte Cell Based on Two Intercalation Electrodes", *J. Electrochem. Soc.*, Mar. (1980), pp. 773–774.

*Primary Examiner*—Paul Lieberman
*Assistant Examiner*—M. Kopec

[57] ABSTRACT

An improved electrochromic layer containing $M_xWO_y$, $M_xNiO_y$, $M_xVO_y$, $M_xMoO_y$, $M_{xCrOy}$, $M_xRuO_y$, $M_xIrO_y$, or $M_xTiO_y$, where M is selected from the group consisting of alkali metals and alkaline earth metals, X is less than 0.06 and Y is in the range from 2 to 3.2. The layer contains the alkali metal or alkaline earth metal when the electrochromic layer is formed.

7 Claims, 2 Drawing Sheets

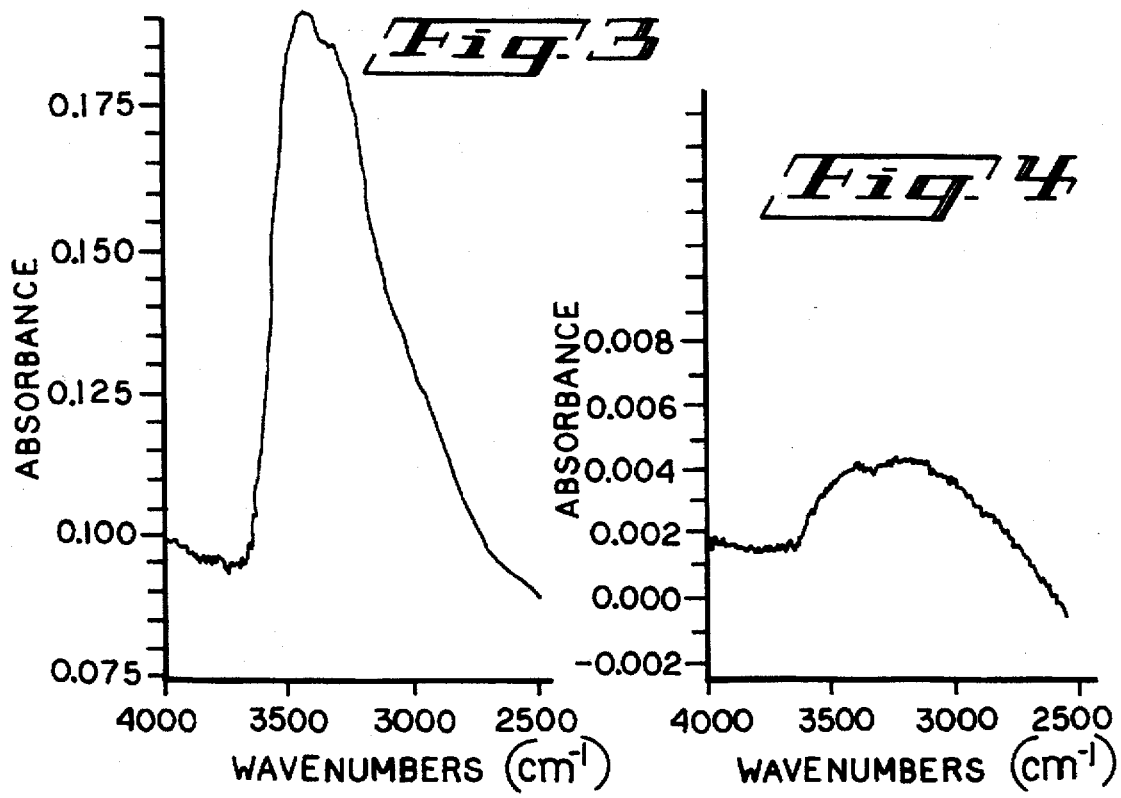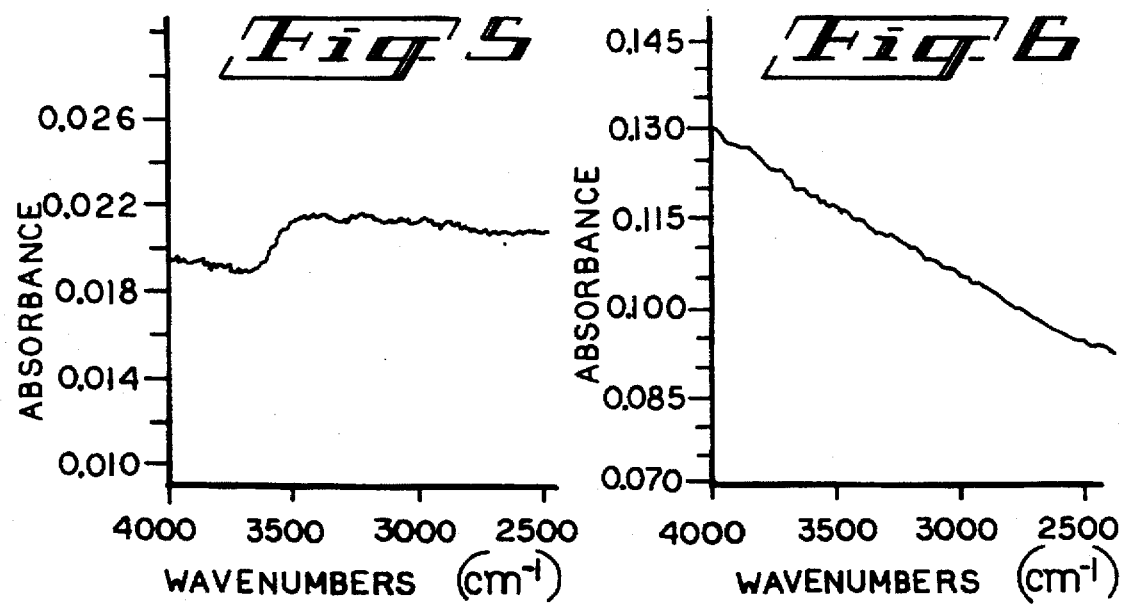

TUNGSTEN OXIDE FOR REVERSIBLE ALKALI METAL INTERCALATION REACTIONS

BACKGROUND

Modern electrochromic devices generally comprise a number of layers, such as in FIG. 1 of U.S. Pat. No. 4,193,670. One example of such a device, described in U.S. Pat. No. 5,124,080, is: a backing of a pane of glass first coated with an electronic conductor such as a thin transparent layer of indium/tin oxide (ITO); the electronic conductor is coated with a thin transparent layer of tungsten oxide to form an electrochromic layer, which, together with the electronic conductor, forms a working electrode; the electrochromic layer is coated with a thin layer of an ion conducting polymer such as a perfluorosulfonate polymer to form an ion conducting layer; and finally the ion conducting layer is coated with a thin transparent coating of gold to form a counter electrode.

The completed device usually has the appearance of lightly tinted transparent glass. The device can be made to transmit substantially less light by applying an electrical potential between the working electrode and the counter electrode. This effect can be reversed by reversing the electrical potential.

The theory of operation of such a device is: (1) hydrogen or alkali metal ions and electrons are forced into the electrochromic layer by the electrical potential imposed between the working electrode and the counter electrode to form a highly colored hydrogen or alkali metal/tungsten oxide bronze in the electrochromic layer, in a process known as intercalation; and (2) when the electrical potential is reversed, the hydrogen or alkali metal ions of the hydrogen or alkali metal/tungsten oxide bronze in the electrochromic layer and electrons are forced out of the electrochromic layer, converting the highly colored hydrogen or alkali metal/tungsten oxide bronze back into the essentially colorless tungsten oxide, in a process known as expulsion.

A problem with such lithium intercalating devices is that the devices fail after the electrical potential is reversed a number of times. For example, failure of such a device can result when the electrochromic layer, or portions of the layer, lose adhesion, or delaminate. When this happens, the delaminated portions of the device remain in the highly colored state.

It would be a further advance in the art of electrochromic devices if loss of electrochromic reversibility of the electrochromic layer were reduced.

SUMMARY OF THE INVENTION

A primary benefit of the instant invention is a solution, to a large degree, of the above mentioned problem of loss of electrochromic reversibility. The instant invention is an improvement in the electrochromic layer. The improved electrochromic layer is much less likely to lose electrochromic reversibility, resulting in a longer lifetime of an electrochromic device incorporating the layer of this invention.

The instant invention is an electrochromic layer comprising a material selected from the group consisting of $M_XWO_Y$, $M_XNiO_Y$, $M_XVO_Y$, $M_XMoO_Y$, $M_XCrO_Y$, $M_XRuO_Y$, $M_XIrO_Y$, and $M_XTiO_Y$, where M is selected from the group consisting of alkali metals and alkaline earth metals, X is less than 0.06 and Y is in the range from 2 to 3.2. The material contains the alkali metal or the alkaline earth metal when the electrochromic layer is formed. When the layer is $M_XWO_Y$, the absorbance of the layer in the infrared spectrum at a wavenumber of about 3350 $cm^{-1}$ is reduced by a factor of at least fifty percent, relative to the absorbance at a wavenumber of about 3350 $cm^{-1}$ of a layer consisting essentially of $WO_3$ made by a comparable process used to make the layer of the instant invention.

The instant invention is also a process for making the electrochromic layer selected from the group consisting of $M_XWO_Y$, $M_XNiO_Y$, $M_XVO_Y$, $M_XMoO_Y$, $M_XCrO_Y$, $M_XRuO_Y$, $M_XIrO_Y$, and $M_XTiO_Y$, where M is selected from the group consisting of alkali metals and alkaline earth metals, X is less than 0.06 and Y is in the range from 2 to 3.2. The process comprises the following steps: mixing together powders selected from the group consisting of powders of compounds of W, Ni, V, Mo, Cr Ru, It, and Ti, and a powder of a compound of M to form a mixture; evaporating the mixture in a reduced pressure environment to form evaporated mixture; and depositing the evaporated mixture onto a substrate to form the electrochromic layer on the substrate.

BRIEF DESCRIPTION OF THE DRAWINGS

FIG. 3 is the infrared spectrum of a layer consisting essentially of tungsten oxide.

FIG. 4 is the infrared spectrum of a layer according to the instant invention wherein M is lithium and the theoretical composition of the layer is about $Li_{0.01}WO_3$.

FIG. 5 is the infrared spectrum of a layer according to the instant invention wherein M is lithium and the theoretical composition of the layer is about $Li_{0.05}WO_3$.

FIG. 6 is the infrared spectrum of a layer according to the instant invention wherein M is lithium and the theoretical composition of the layer is about $Li_{0.10}WO_3$.

DETAILED DESCRIPTION OF THE INVENTION

Figure 1:
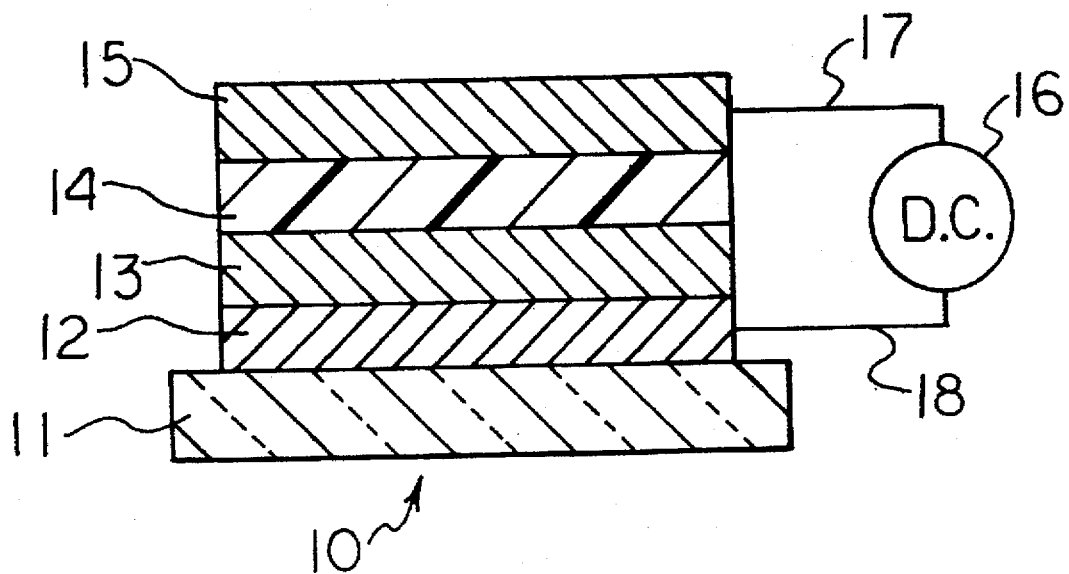
FIG. 1 is a cross-sectional side view of the various layers of an electrochromic device incorporating the instant invention.

Referring now to FIG. 1, therein is shown an electrochromic device 10 which includes a pane of glass 11. An electronically conducting layer 12 of indium/tin oxide (ITO) is coated on the upper side of the glass 11. Glass coated with indium tin oxide is commercially available, e.g., from the Donnelly Corp., Holland, Mich., as ITO glass PD5002.

An electrochromic layer 13 of $M_XWO_Y$ is deposited on the electronically conducting layer 12 using the process described below in reference to FIG. 2. The electrochromic layer 13 is a film comprising $M_XWO_Y$, where M is an alkali metal such as lithium or cesium or an alkaline earth metal such as magnesium. X is preferably less than about 0.06, more preferably less than about 0.045, and even more preferably less than about 0.029. X is preferably greater than 0.001, more preferably greater than 0.003, even more preferably greater than 0.005 and yet even more preferably greater than 0.007. The $M_XWO_Y$ contains the alkali metal or alkaline earth metal when the electrochromic layer 13 is formed. It should be understood that the electrochromic layer can also comprise $M_XNiO_Y$, $M_XVO_Y$, $M_XMoO_Y$, $M_XCrO_Y$, $M_XRuO_Y$, $M_XIrO_Y$, and $M_XTiO_Y$.

An ion conducting layer 14 of an ion conducting polymer or inorganic layer, such as the lithium ion form of perfluorosulfonate polymer (PFSA$^-$Li$^+$), is formed on the electrochromic layer 13. The ion conducting layer 14 of perfluorosulfonate polymer can be formed by dip coating, see, for example, U.S. Pat. No. 5,124,080, by coating with a draw rod, or by spray coating equipment. It should be understood that the process for forming the ion conducting layer 14 is not critical in the instant invention. It should also be understood that the particular material used for the ion conducting layer is not critical.

A counter electrode layer 15 of gold on iridium oxide ($IRO_{2.5}$) is deposited on the ion conducting layer 14. A direct current power supply 16 is connected to the electronically conducting layer 12 and the counter electrode layer 15 via a wire 17 and a wire 18.

The specific material used for the electronically conducting layer 12 is not critical in the present invention and can include gold (Au) and other metals or nonmetals although tin doped indium oxide (ITO) is often preferred when the device is formed on a pane of glass 11 as shown in FIG. 1. In some applications plastic or other suitable materials will be used instead of a pane of glass 11 and it need not be transparent. The specific material used for the counter electrode layer 15 is not critical in the present invention and can include gold, gold on iridium oxide or other materials.

Figure 2:
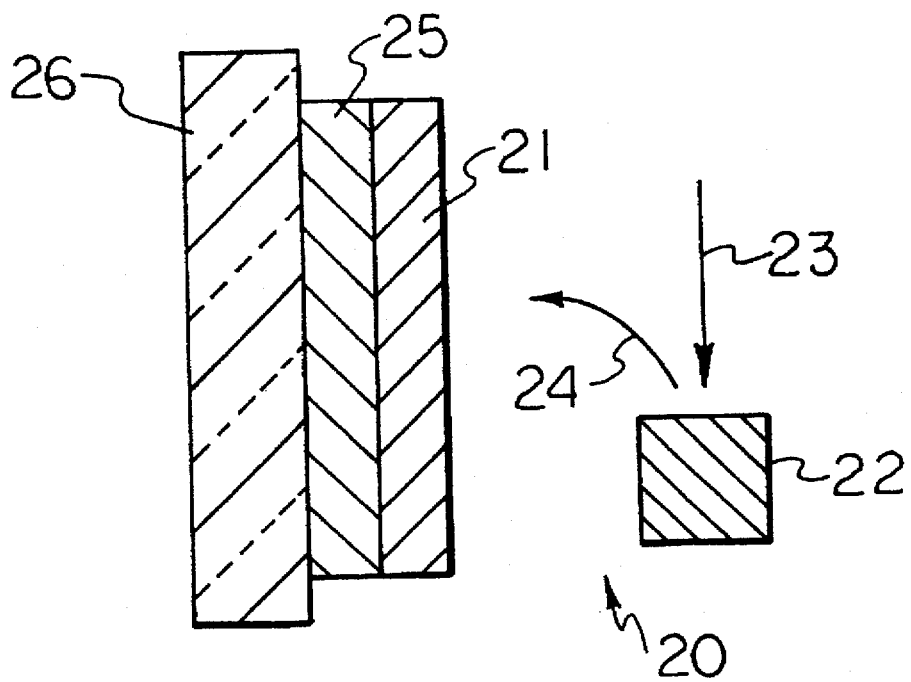
FIG. 2 is a cross-sectional view of the formation of a layer according to the instant invention.

Referring now to FIG. 2, therein is shown a method 20 for making an electrochromic layer 21 of $M_xWO_y$ according to the instant invention. The electrochromic layer 21 is shown on a layer of ITO 25. The layer of ITO 25 is shown on a pane of glass 26. A pellet 22 is formed by grinding together powders of $WO_3$ and a compound of M, where M is an alkali metal or an alkaline earth metal. For example, the M compound can be lithium oxide, cesium oxide, magnesium oxide, lithium hydroxide, lithium chloride, lithium carbonate, or any other compound of an alkali metal or alkaline earth metal. However, it is often advantageous to use the metal oxide. The powders of $WO_3$ and the compound of M are ground together with a mortar and pestle in the proper mole ratios to form a mixture, and the mixture is then pressed into a pellet 22 in a die at about 10,000 psi pressure.

The pellet 22 is then placed in a graphite crucible from which it is evaporated in a partial vacuum using an electron beam 23 to form evaporated mixture 24. Electron beam evaporation to form evaporated mixture 24 is preferably done in a deposition chamber maintained at $8 \times 10^{-4}$ torr pressure with pure oxygen which has been humidified to about 50% relative humidity. This pressure is a reduced pressure, i.e., less than atmospheric pressure, and preferably much less than atmospheric pressure, in order to facilitate the formation of the layer. The evaporated mixture 24 is deposited onto the indium/tin oxide layer 25. The result is an electrochromic layer having the composition $M_xWO_y$.

It should be understood that the deposition of the electrochromic layer 21 may be formed by other means such as sputtering, but that electron beam evaporation is the preferred means for deposition of the electrochromic layer 21.

It should be understood that, while the above discussion focused on an electrochromic layer made of $M_xWO_y$, $M_xNiO_y$, $M_xVO_y$, $M_xMoO_y$, $M_xCrO_y$, $M_xRuO_y$, $M_xIrO_y$, and $M_xTiO_y$. Such layers can be made by mixing powders selected from the group consisting of powders of compounds of W, Ni, V, Mo, Cr, Ru, It, and Ti, and a powder of a compound of M to form a mixture; evaporating the mixture in a reduced pressure oxygen environment to form an evaporated mixture; and depositing the evaporated mixture onto a substrate to form the layer on the substrate. Preferably, the compounds of W, Ni, V, Mo, Cr, Ru, It, and Ti are $WO_3$, $NiO_2$, $V_2O_5$, $MoO_3$, $CrO_3$, $RuO_2$, $ItO_2$.

EXAMPLE 1

An electrochromic layer comprising $M_xWO_y$ is formed according to the method shown in FIG. 2, wherein M is lithium and X is 0.028. 1.5 milligrams of $Li_2O$ and 232 milligrams of $WO_3$ powder are mixed and pressed into a pellet 22. The pellet 22 is placed in a graphite crucible from which it is e-beam evaporated at a rate of two to four angsttoms per second to a total thickness of about 3500 angstroms. The electrochromic layer 21 is deposited on ITO glass 26. The resulting $Li_{0.028}WO_y$ film is then heated in air at 140 degrees centigrade for two hours. The value of Y in this example is, of course, approximately 3 and this value will used below even though, strictly speaking, the real value is slightly different. Heating the layer is believed to improve its physical integrity and its durability during ion expulsion/intercalation, apparently due to the removal of excess water by heating. The utility of the heating step is believed to depend on the amount of excess water bound in the film during its formation, and also on the specific film forming conditions.

The expected composition of the material described above would be $Li_{0.10}WO_3$, based on the described molar ratios of the $Li_2O$ and $WO_3$. However, when e-beam deposition is used, the composition of the resulting film has a lower lithium content than expected. The actual composition is thus $Li_{0.028}WO_3$. Therefore, references to "theoretical composition" herein and in the claims mean that the composition is the expected composition based on the molar ratios of the starting materials using the described e-beam evaporation technique. Any other references herein and in the claims will be to the actual composition of the film. When the starting materials are $Li_2O$ and $WO_3$, the actual composition differs from the theoretical composition by a factor of about 3.5, using the electron beam process described above in reference to FIG. 2. The actual composition to theoretical composition ratio varies, depending on the starting materials used. The difference between the theoretical composition and the actual composition will be discussed in more detail below in Example 2.

232 milligrams of $WO_3$ powder is pressed into a pellet. A $WO_3$ film is formed by the same procedure described above for the $Li_{0.028}WO_3$ film. The $WO_3$ film has the same thickness as the $Li_{0.028}WO_3$ film. The $WO_3$ film is heated in air at 140 degrees centigrade for two hours.

Infrared analysis of electrochromic layers having theoretical compositions of $WO_3$, $Li_{0.01}WO_3$, $Li_{0.05}WO_3$, and $Li_{0.10}WO_3$ are shown in FIGS. 3, 4, 5 and 6, respectively. Each spectrum reveals a band at a wavenumber of about 3350 $cm^{-1}$. In FIG. 3, the band at about 3350 $cm^{-1}$ for the $WO_3$ film has an absorbance of about 0.095. On the other hand, the band in FIG. 4 at about 3350 $cm^{-1}$ for the film having a theoretical composition of $Li_{0.01}WO_3$ has an absorbance of about 0.0027. The band in FIG. 5 at about 3350 $cm^{-1}$ for the film having a theoretical composition of $Li_{0.05}WO_3$ has an absorbance of about 0.001. The band in FIG. 6 at about 3350 $cm^{-1}$ or the film having a theoretical composition of $Li_{0.10}WO_3$ has an absorbance of about zero. Thus, the absorbance of the band in the infrared spectrum at a wavenumber of about 3350 $cm^{-1}$ for the $Li_xWO_y$ layer is reduced, relative to the absorbance of the same band of the layer comprising $WO_3$ made by a comparable process used to make the layer comprising the $Li_xWO_y$, by a factor of at least fifty percent. More preferably, the absorbance of the band in the infrared spectrum at a wavenumber of about 3350 $cm^{-1}$ for the $Li_xWO_y$ layer is reduced, relative to the absorbance of the same band of the layer comprising $WO_3$ made by a comparable process used to make the layer comprising the $Li_xWO_y$, by a factor of at least ninety percent and even more preferably by a factor of at least ninety seven percent. The term "comparable process" here and in the claims means the same process used to make the layer comprising the $M_xWO_y$, but without adding any M.

EXAMPLE 2

An electrochromic layer comprising a theoretical composition of $Li_{0.20}WO_3$ is analyzed using inductively coupled plasma emission spectroscopy (ICP). The expected weight ratio of lithium to tungsten is $7.5 \times 10^{-3}$. This theoretical weight ratio is based on 0.20 moles of lithium for every mole of tungsten. However, the actual weight ratio of lithium to tungsten, determined by inductively coupled plasma emission spectroscopy, is $2.1 \times 10^{-3}$. Thus, less than the stoichiometric amount of lithium is incorporated into the film during the electron beam evaporation process. In fact, the amount of lithium is reduced by a factor of about 3.5. As a result, the actual formula of the layer in this example is $Li_{0.06}WO_3$. This reduction in lithium in the film could be the result of the higher melting point of $Li_2O$, which is greater than 1700 degrees centigrade, compared to the melting point of $WO_3$, which is 1473 degrees centigrade.

EXAMPLE 3

The cycle life of a non-lithiated electrochromic device is tested and compared to the cycle life of a device incorporating an electrochromic layer comprising $M_xWO_y$, of the instant invention. The term "non-lithiated" means herein that the electrochromic layer of the device consists essentially of $WO_3$.

A non-lithiated electrochromic device having the configuration:

ITO/WO$_3$/PFSA$^-$Li$^+$/Au is made. The non-lithiated device is then placed in a 35% RH humidified flowing nitrogen stream. The electrochromic device is then cycled by applying a voltage with negative bias of 2.0 volts for 2 minutes on the $WO_3$ layer to produce blue color, then positive 2.0 volts for 5 minutes on the $WO_3$, to bleach. The non-lithiated device fails at about 4500 cycles, remaining in the blue state, even upon prolonged anodic polarization.

A lithiated electrochromic device is then made according to the instant invention, the device having the configuration:

ITO/Li$_{0.014}$WO$_3$/PFSA$^-$Li$^+$/IrO$_{2.5}$/Au

The lithiated device is cycled using the same voltages applied to the non-lithiated device. The results are given in Table I.

TABLE I

| Cycle | Optical Density at 50 sec. | EC Efficiency at 50 sec. | Contrast Ratio |
|---|---|---|---|
| 0 | 0.135 | 30 | 1.4 |
| 10 | 0.266 | 33 | 1.9 |
| 100 | 0.239 | 32 | 1.8 |
| 500 | 0.325 | 33 | 2.3 |
| 1000 | 0.33 | 33 | 2.4 |
| 2000 | 0.41 | 36 | 2.7 |
| 3000 | 0.39 | 35 | 2.6 |
| 4000 | 0.299 | 32 | 2.1 |
| 5000 | 0.241 | 31 | 1.8 |
| 6000 | 0.285 | 30 | 2.0 |
| 7000 | 0.259 | 31 | 1.9 |
| 8000 | 0.229 | 32 | 1.8 |
| 9000 | 0.233 | 32 | 1.8 |
| 10,000 | 0.220 | 30 | 1.7 |
| 11,000 | 0.280 | 31 | 2.1 |

Optical density (OD) is equivalent to absorbance in the colored state. High values of optical density represent a bluer film. In other words, a film with a high optical density has a more intense color than a film with a low optical density.

Electrochromic (EC) efficiency is the amount of optical density change between the colored and noncolored states per electron injected into the film. The units for electrochromic efficiency are $cm^2$/coulomb. The higher the electrochromic efficiency, the more efficient the electron transfer performance.

Contrast ratio represents the difference in color between intercalated and expulsed states of $M_xWO_y$. The higher the contrast ratio, the better the performance. When certain sections of a device fail by remaining permanently colored blue, the contrast ratio becomes zero in these sections, and the entire device is considered to have failed.

The device of Table I fails after 11,000 cycles. Failure occurs when the device remains permanently blue in certain sections, i.e., no longer colors uniformly. This cycle life for the lithiated devices is at least two and one half times greater than the cycle life of the non-lithiated devices.

EXAMPLE 4

An electrochromic layer comprising $M_xWO_y$ is formed according to the method shown in FIG. 2, wherein M is cesium. 14.1 milligrams of $Cs_2O$ and 232 milligrams of $WO_3$ powder are mixed and pressed into a pellet 22. The pellet 22 is placed in a graphite crucible from which it is e-beam evaporated at a rate of two to four angstroms per second to a total thickness of about 3500 angsttoms. The electrochromic layer 21 is deposited on ITO glass 26. The resulting $Cs_{0.028}WO_3$ film is then heated in air at 140 degrees centigrade for two hours.

An electrochromic device is made from this layer having the configuration:

ITO/Cs$_{0.028}$WO$_3$/PFSA$^-$Li$^+$/IrO$_{2.5}$/Au

The device is cycled using the same conditions used in Example 3 and shows a cycle life of 10,000 cycles.

What is claimed is:

1. An electrochromic layer comprising a material selected from the group consisting of $M_xWO_y$, $M_xNiO_y$, $M_xMoO_y$, $M_xCrO_y$, $M_xRuO_y$, $M_xIrO_y$, or $M_xTiO_y$, where M is selected from the group consisting of alkali metals and alkaline earth metals, X is less than 0.06 and greater than 0.001, and Y is in the range from 2 to 3.2, the material containing M as the electrochromic layer is initially formed.

2. The layer of claim 1, wherein the material is $M_xWO_y$.

3. The layer of claim 2, where the absorbance of the layer in the infrared spectrum at a wavenumber of about 3350 $cm^{-1}$ is reduced, relative to the absorbance of a layer consisting essentially of $WO_3$ made by a comparable process used to make the layer comprising the $M_xWO_y$, by a factor of at least fifty percent.

4. The layer of claim 2, wherein M is selected from the group consisting of lithium and cesium.

5. The layer of claim 3, wherein M is selected from the group consisting of lithium and cesium.

6. The layer of claim 5, wherein X is less than 0.045 but greater than 0.003.

7. The layer of claim 5, wherein X is less than 0.029 but greater than 0.007.

* * * * *

UNITED STATES PATENT AND TRADEMARK OFFICE
CERTIFICATE OF CORRECTION

PATENT NO. : 5,707,556

DATED : January 13, 1998

INVENTOR(S) : Susan J. Babinec; Marianne L. McKelvy

It is certified that error appears in the above-identified patent and that said Letters Patent is hereby corrected as shown below:

Title page, column 2, Abstract, line 2 "$M_xCrO_y$" should correctly read -- $M_xCrO_y$ --

Signed and Sealed this

Twenty-sixth Day of May, 1998

Attest:

BRUCE LEHMAN

*Attesting Officer*     *Commissioner of Patents and Trademarks*